United States Patent
Saito (10) Patent No.: US 9,663,116 B2
(45) Date of Patent: May 30, 2017

(54) FUEL SAVING DRIVING DIAGNOSTIC DEVICE AND FUEL SAVING DRIVING DIAGNOSTIC SYSTEM

(71) Applicant: TOYOTA JIDOSHA KABUSHIKI KAISHA, Toyota-shi, Aichi-ken (JP)

(72) Inventor: Kan Saito, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/898,221

(22) PCT Filed: Jul. 7, 2014

(86) PCT No.: PCT/IB2014/001274
§ 371 (c)(1),
(2) Date: Dec. 14, 2015

(87) PCT Pub. No.: WO2015/008122
PCT Pub. Date: Jan. 22, 2015

(65) Prior Publication Data
US 2016/0288800 A1  Oct. 6, 2016

(30) Foreign Application Priority Data
Jul. 16, 2013 (JP) ................. 2013-147890

(51) Int. Cl.
| | |
|---|---|
| *G01F 7/00* | (2006.01) |
| *F02D 11/10* | (2006.01) |
| *B60W 50/04* | (2006.01) |
| *B60W 50/14* | (2012.01) |
| *F16H 59/36* | (2006.01) |

(Continued)

(52) U.S. Cl.
CPC .......... *B60W 50/045* (2013.01); *B60W 50/14* (2013.01); *B60K 2350/1092* (2013.01); *B60W 2510/0638* (2013.01); *B60W 2520/10* (2013.01); *B60W 2540/10* (2013.01); *B60W 2710/1005* (2013.01); *F16H 2059/366* (2013.01); *F16H 2061/0015* (2013.01);
(Continued)

(58) Field of Classification Search
USPC ........................................ 701/29.1; 123/399
See application file for complete search history.

(56) References Cited

U.S. PATENT DOCUMENTS

| | | | | |
|---|---|---|---|---|
| 2007/0276582 A1* | 11/2007 | Coughlin | .............. | B60W 40/09 701/123 |
| 2009/0288636 A1* | 11/2009 | Saito | ..................... | B60W 50/14 123/399 |

(Continued)

FOREIGN PATENT DOCUMENTS

| | | | |
|---|---|---|---|
| DE | 10 2011 103 722 A1 | 12/2012 | |
| EP | 1 930 631 A2 | 6/2008 | |

(Continued)

*Primary Examiner* — Tyler Paige
(74) *Attorney, Agent, or Firm* — Oliff PLC (57) ABSTRACT

A fuel saving driving diagnostic device includes an ECU that diagnoses fuel saving driving from a viewpoint of accelerator operation based on a relation between a parameter related to a vehicle speed and a parameter related to an accelerator operation amount and diagnoses fuel saving driving from a viewpoint of shift operation based on a relation between a parameter related to a vehicle speed and a parameter related to an engine speed.

6 Claims, 4 Drawing Sheets

(51) Int. Cl.
*F16H 61/02* (2006.01)
*F16H 61/00* (2006.01)

(52) U.S. Cl.
CPC ......... *F16H 2061/022* (2013.01); *Y02T 10/52* (2013.01); *Y02T 10/7258* (2013.01); *Y02T 10/76* (2013.01)

(56) References Cited

U.S. PATENT DOCUMENTS

| | | | | |
|---|---|---|---|---|
| 2012/0304800 | A1* | 12/2012 | Sakaguchi | B60K 26/021 74/513 |
| 2014/0129099 | A1* | 5/2014 | Fuke | F02D 29/02 701/51 |

FOREIGN PATENT DOCUMENTS

| | | |
|---|---|---|
| FR | 2 959 292 A1 | 10/2011 |
| JP | 2006-057484 A | 3/2006 |
| JP | 2008-105559 A | 5/2008 |
| JP | 2012-001185 A | 1/2012 |
| JP | 2012-197069 A | 10/2012 |
| WO | 2013/001998 A1 | 1/2013 |

* cited by examiner

FUEL SAVING DRIVING DIAGNOSTIC DEVICE AND FUEL SAVING DRIVING DIAGNOSTIC SYSTEM

BACKGROUND OF THE INVENTION

1. Field of the Invention

The present invention relates to a fuel saving driving diagnostic device and a fuel saving driving diagnostic system.

2. Description of Related Art

A driving support device is known that displays the actual accelerator-pedal opening and the reference guide value of the accelerator-pedal opening, which maintains both acceleration performance and fuel efficiency in the current driving status, at the same time on a display unit (for example, see International Publication Pamphlet WO2013/001998). When the current transmission gear ratio of the transmission deviates from the optimum transmission gear ratio of the transmission determined according to the driving status of the vehicle, this driving support device changes the reference guide value to a value that reduces the engine output of a vehicle.

SUMMARY OF THE INVENTION

However, the driving support device with the configuration described in International Publication Pamphlet WO2013/001998, which considers the transmission gear ratio of the transmission, only presents the reference guide value of the accelerator-pedal opening to the driver. That is, the driving support device derives the reference guide value of the accelerator-pedal opening in the current gear position (or at its change time) without determining whether the shift operation is proper. Therefore, the driver can determine whether the current accelerator-pedal opening is proper from the viewpoint of fuel saving driving but sometimes cannot determine whether the currently selected gear position is proper from the viewpoint of fuel saving driving.

The present invention provides a fuel saving driving diagnostic device that can diagnose fuel saving driving both from the viewpoint of accelerator operation and from the viewpoint of shift operation.

A fuel saving driving diagnostic device in a first aspect of the present invention includes an ECU that diagnoses fuel saving driving from a viewpoint of accelerator operation based on a relation between a parameter related to a vehicle speed and a parameter related to an accelerator operation amount and diagnoses fuel saving driving from a viewpoint of shift operation based on a relation between a parameter related to a vehicle speed and a parameter related to an engine speed.

A fuel saving driving diagnostic system in a second aspect of the present invention includes a speed sensor that detects a travel speed of a vehicle; an opening detection sensor that detects an accelerator pedal opening; an engine speed sensor that detects an engine speed; and an ECU that performs a first diagnosis and a second diagnosis and outputs a diagnostic result according to a diagnostic result of the first diagnosis and a diagnostic result of the second diagnosis, the first diagnosis being a diagnosis of fuel saving driving based on the travel speed and the opening, the second diagnosis being a diagnosis of fuel saving driving based on the travel speed and the engine speed.

According to the mode described above, fuel saving driving can be diagnosed both from the viewpoint of accelerator operation and from the viewpoint of shift operation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments are described below in detail with reference to the attached drawings.

Figure 1:
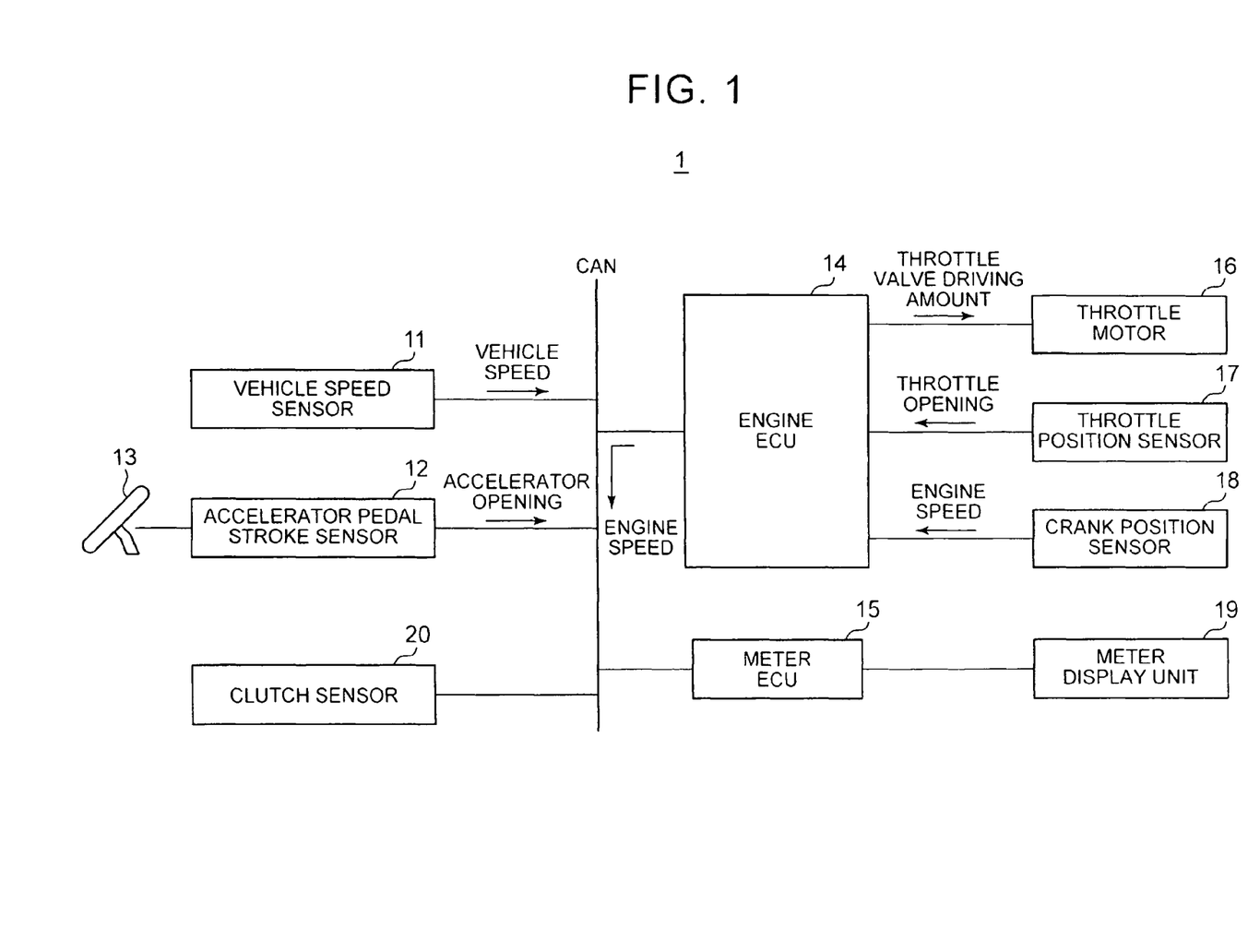
FIG. 1 is a configuration diagram showing a fuel saving driving diagnostic device in one embodiment of the present invention.

FIG. 1 is a configuration diagram showing a fuel saving driving diagnostic device 1 in one embodiment. The fuel saving driving diagnostic device 1, usually mounted in a manual transmission (MT) vehicle, is applicable also to an automatic transmission (AT) vehicle that has an automatic transmission. That is, the fuel saving driving diagnostic device 1 may be mounted in an AT vehicle that has a manual mode (for example, sports mode, sequential shift) in which the driver can arbitrarily select a gear position. The fuel saving driving diagnostic device 1 is mounted in a vehicle that has an engine (including a hybrid electric vehicle). When the fuel-saving driving diagnostic device 1 is mounted, a hybrid electric vehicle may have a configuration in which an electric motor is provided for generating an assist torque to maintain correlation between the vehicle speed and the engine speed.

The fuel saving driving diagnostic device 1 includes an engine electrical control unit (ECU) 14 and a meter ECU 15. The engine ECU 14 and the meter ECU 15 may be connected via an in-vehicle LAN such as a controller area network (CAN). Sensors (vehicle speed sensor 11, accelerator pedal stroke sensor 12, clutch sensor 20, etc.,) for detecting the traveling status and the operation status may be connected to the in-vehicle LAN.

Each of the meter ECU 15 and the engine ECU 14 is configured by a microcomputer in which the following components are interconnected via a bus: a CPU that executes a program, a RAM in which a work area for program execution is reserved or data is stored temporarily, an electronically erasable and programmable read-only memory (EEPROM) that retains data even in the ignition off state, an input/output interface that works as a data input/output interface or an interface with other ECUs, a communication controller that communicates with other ECUs, and a ROM in which programs are stored.

The vehicle speed sensor 11 detects the vehicle speed. The vehicle speed sensor 11 may use any vehicle speed detection method. For example, the vehicle speed sensor 11 detects a magnetic flux change, generated by the passage of the convex parts equally spaced on the circumference of the rotor on each wheel, as a pulse and outputs the vehicle speed calculated from the number of pulses detected for each predetermined sampling time.

The accelerator pedal stroke sensor 12 detects the operation amount (accelerator opening) of an accelerator pedal 13. The accelerator pedal stroke sensor 12 may use any accelerator opening detection method. For example, the accelerator pedal stroke sensor 12 detects the accelerator opening based on the fact that the intensity of the magnetic field that passes through the Hall effect sensor depends on the operation amount of the accelerator pedal 13.

The clutch sensor 20 detects the clutch engagement state of the manual transmission. When the vehicle is an AT vehicle with the automatic transmission, the clutch sensor 20 may be a shift position sensor that detects at least the neutral shift position.

The engine ECU 14 controls the engine. For example, the engine ECU 14 may perform various engine control operations including the following control: fuel injection control for controlling the amount of fuel to be injected according to the accelerator opening and the ignition timing control for energizing the spark plug at the best time. A crank position sensor 18, a throttle position sensor 17 that detects the throttle angle, and a throttle motor 16 that opens and closes the throttle valve may be connected to the engine ECU 14. The engine ECU 14 may detect (or calculate) the engine speed based on the signal from the crank position sensor 18.

The meter ECU 15 may acquire signals from various sensors, other ECUs, and switches and, based on these signals, display the vehicle state such as the vehicle speed and the engine speed, and turns on predetermined marks indicating a warning condition such as a half-opened door condition, on the meter display unit 19.

The meter ECU 15 diagnoses fuel saving driving, based on the vehicle speed from the vehicle speed sensor 11, the operation amount of the accelerator pedal 13 from the accelerator pedal stroke sensor 12, and the engine speed from the engine ECU 14. At this time, the meter ECU 15 diagnoses fuel saving driving from the viewpoint of accelerator operation based on the relation between the vehicle speed and the operation amount of the accelerator pedal 13. At the same time, the meter ECU 15 diagnoses fuel saving driving from the viewpoint of shift operation based on the relation between the vehicle speed and the engine speed. The following describes the fuel saving driving diagnostic method in detail.

Figure 2A:
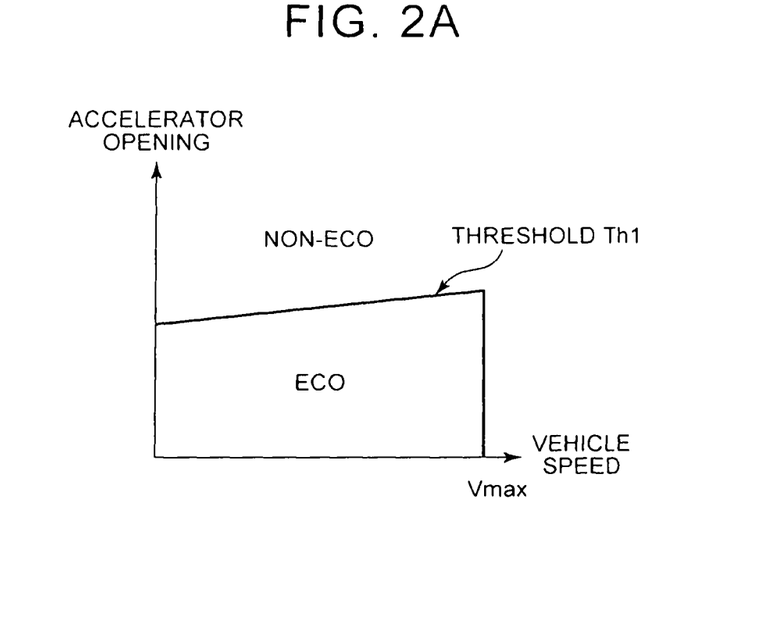
FIG. 2A is a diagram showing an example of a fuel saving driving diagnostic method from the viewpoint of accelerator operation.
Figure 2B:
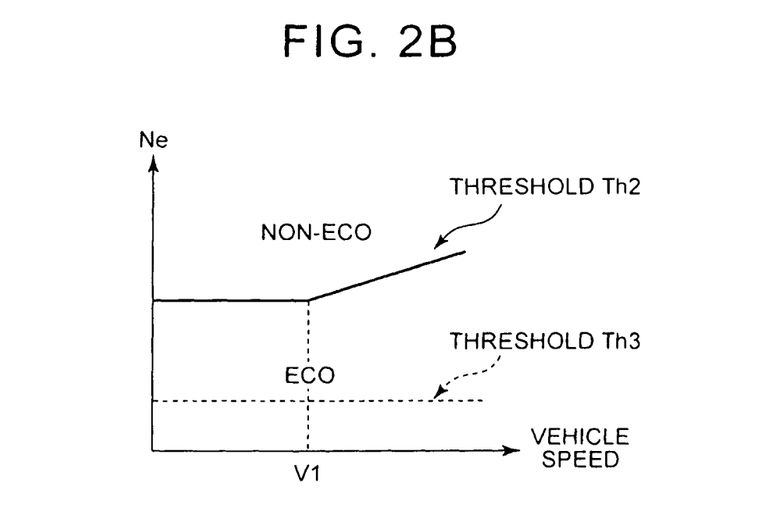
FIG. 2B is a diagram showing an example of a fuel saving driving diagnostic method from the viewpoint of shift operation.

FIGS. 2A and 2B are diagrams showing examples of fuel saving driving diagnostic method. FIG. 2A is a diagram showing an example of the fuel saving driving diagnostic method from the viewpoint of accelerator operation. FIG. 2B is a diagram showing an example of the fuel saving driving diagnostic method from the viewpoint of shift operation.

FIG. 2A shows the fuel saving driving area (ECO) and the non-fuel-saving driving area (non-ECO) where the horizontal axis indicates the vehicle speed and the vertical axis indicates the accelerator opening. When the relation between the vehicle speed and the accelerator opening belongs to the fuel saving driving area shown in FIG. 2A, the meter ECU 15 determines that the vehicle is driving in fuel saving mode from the viewpoint of accelerator operation. On the other hand, when the relation between the vehicle speed and the accelerator opening belongs to the non-fuel-saving driving area shown in FIG. 2A, the meter ECU 15 determines that the vehicle is not driving in fuel saving mode from the viewpoint of accelerator operation. The threshold Th1, a value separating between the fuel saving driving area and the non-fuel-saving driving area, may be determined appropriately based on the design concept (concept of fuel saving). Although linearly increased with the vehicle speed in the example shown in FIG. 2A, the threshold Th1 may be set arbitrarily. For example, the threshold Th1 may increase non-linearly with the vehicle speed. In addition, when the vehicle speed exceeds a predetermined upper limit value Vmax, the example shown in FIG. 2A indicates that the whole area of the accelerator opening becomes the non-fuel-saving driving area. In such a case, this upper limit value Vmax may be omitted. In addition, the upper limit value Vmax may be varied dynamically.

In the example shown in FIG. 2A, the meter ECU 15 determines whether the vehicle is driving in fuel saving mode from the viewpoint of accelerator operation based on the relation between the vehicle speed and the accelerator opening. In this case, a parameter that can be uniquely derived from the accelerator opening may be used in place of the accelerator opening (a parameter that has a one-to-one correspondence with the accelerator opening). For example, the throttle angle or the output power may be used in place of the accelerator opening. In this case, the output power may be derived from the product of the engine torque, engine speed, and transmission efficiency. The output power may also be derived from the product of the driving force and the vehicle speed. In addition, the output power may be derived using a detection value of a sensor (for example, an engine-speed detection value) or using a control target value. Similarly, when the throttle angle is used, a detection value of a sensor or a control target value may be used. When a parameter other than the accelerator opening is used, the threshold Th1 is of course a value corresponding to that parameter.

FIG. 2B shows the fuel saving driving area (ECO) and the non-fuel-saving driving area (non-ECO) where the horizontal axis indicates the vehicle speed and the vertical axis indicates the engine speed (Ne). In this case, when the relation between the vehicle speed and the engine speed belongs to the fuel saving driving area, the meter ECU 15 determines that the vehicle is driving in fuel saving mode from the viewpoint of shift operation. On the other hand, when the relation between the vehicle speed and the engine speed belongs to the non-fuel-saving driving area, the meter ECU 15 determines that the vehicle is not driving in fuel saving mode from the viewpoint of shift operation. The threshold Th2, a value separating between the fuel saving driving area and the non-fuel-saving driving area, may be determined appropriately based on the design concept. In the example shown in FIG. 2B, the threshold Th2, which separates between the fuel saving driving area and the non-fuel-saving driving area, remains constant until the vehicle speed reaches a predetermined vehicle speed V1 and, at a vehicle speed higher than the predetermined vehicle speed V1, linearly increases with the vehicle speed. Instead of this setting, the threshold Th2 may be set arbitrarily. The lower limit threshold Th3 may be set in addition to the threshold Th2. In this case, the area below the lower limit threshold Th3 corresponds to the non-fuel-saving driving area. The lower limit threshold Th3 may be set arbitrarily. The lower limit threshold Th3 may be the lower limit value of a range where no engine stall is generated while maintaining fuel efficiency. In the example shown in FIG. 2B, the lower limit threshold Th3 is constant.

For an AT vehicle, a correct gear position is selected automatically according to the vehicle speed. Therefore, it is sufficient to determine whether the vehicle is driving in fuel saving mode from the viewpoint of accelerator operation. However, for an MT vehicle, the shift operation affects the fuel efficiency. Therefore, it may not be sufficient to determine whether the vehicle is driving in fuel saving mode only from the viewpoint of accelerator operation. This means that the problem with an MT vehicle is that, in a configuration in which the meter ECU 15 determines whether the vehicle is driving in fuel saving mode only from the viewpoint of accelerator operation, the meter ECU 15 may determine that the vehicle is driving in fuel saving mode even when the gear position is incorrect from the viewpoint of fuel efficiency. This problem applies not only to an MT vehicle but also to the manual mode operation of an AT vehicle as described above.

To solve this problem, this embodiment determines whether the vehicle is driving in fuel saving mode not only from the viewpoint of accelerator operation but also from the viewpoint of shift operation. This allows the fuel saving driving of an MT vehicle to be correctly diagnosed both from the viewpoint of accelerator operation and from the viewpoint of shift operation. That is, if it is determined that the vehicle is driving in fuel saving mode from the viewpoint of accelerator operation, but not from the viewpoint of shift operation, it is comprehensively determined that the vehicle is not driving in fuel saving mode.

According to this embodiment, the meter ECU 15 determines whether the vehicle is driving in fuel saving mode from the viewpoint of shift operation based on the relation between the vehicle speed and the engine speed. This properly determines whether the currently selected gear position is correct (whether the gear position is correct from the viewpoint of fuel efficiency). In another possible comparative example of this embodiment, the information on the optimum accelerator opening for the current shift position is given (transmitted) to the driver. However, though a shift position is considered in such a comparative example to determine whether the fuel efficiency is good, only the information on whether the current accelerator operation is correct for the current shift position is transmitted to driver. In contrast, this embodiment can transmit to the driver the information on whether both the accelerator operation and the shift operation are correct (whether both are correct from the viewpoint of fuel efficiency). In addition, this embodiment can determine whether the vehicle is driving in fuel saving mode from the viewpoint of shift operation without requiring the information on the currently selected gear position. It should be noted here that a sensor for detecting the currently selected gear position (logic for estimating the currently selected gear position) may be provided for another use.

Figure 3:
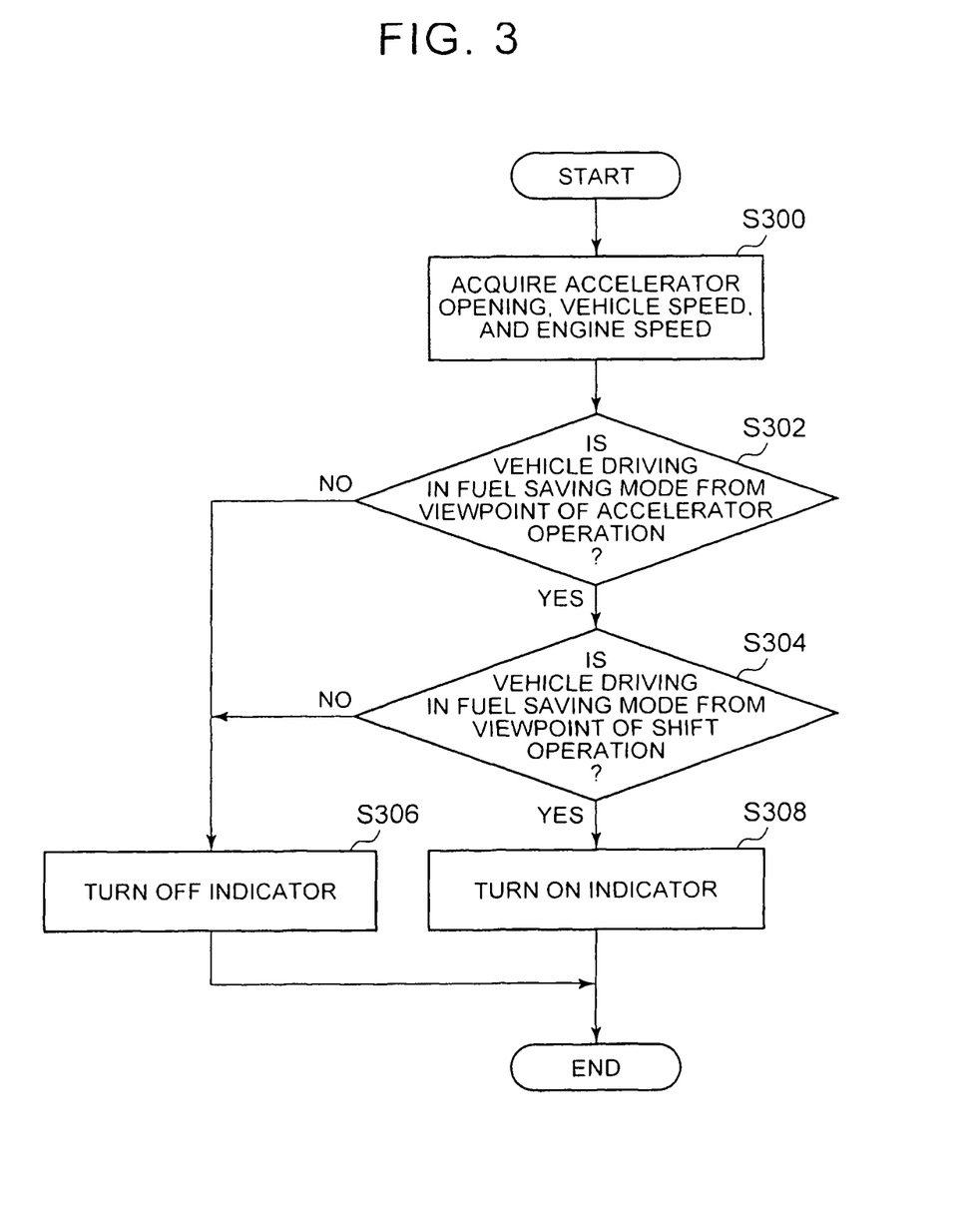
FIG. 3 is a flowchart showing an example of fuel saving driving determination processing executed by a meter ECU.

FIG. 3 is a flowchart showing an example of the fuel saving driving determination processing executed by the meter ECU 15. The processing routine shown in FIG. 3 may be executed repeatedly at predetermined periodic intervals during the travel of a vehicle.

In step 300, the meter ECU 15 acquires the latest information on the accelerator opening, vehicle speed, and the engine speed.

In step 302, based on the relation between the vehicle speed and the accelerator opening acquired in step 300, the meter ECU 15 determines whether the vehicle is driving in fuel saving mode from the viewpoint of accelerator operation. For example, the threshold Th1 (see FIG. 2A) corresponding to the current vehicle speed is calculated from the map to determine whether the current accelerator opening is higher than the calculated threshold Th1. In this case, if the current accelerator opening is higher than the threshold Th1, the processing proceeds to step 306 upon determination that the vehicle is not driving in fuel saving mode from the viewpoint of accelerator operation. On the other hand, if the current accelerator opening is equal to or lower than the threshold Th1, the processing proceeds to step 304 upon determination that the vehicle is driving in fuel saving mode from the viewpoint of accelerator operation.

In step 304, based on the relation between the vehicle speed and the engine speed acquired in step 300, the meter ECU 15 determines whether the vehicle is driving in fuel saving mode from the viewpoint of shift operation. For example, the threshold Th2 (see FIG. 2B) corresponding to the current vehicle speed is calculated from the map to determine whether the current engine speed is higher than the calculated threshold Th2. In this case, if the current engine speed is higher than the threshold Th2, the processing proceeds to step 306 upon determination that the vehicle is not driving in fuel saving mode from the viewpoint of shift operation. On the other hand, if the current engine speed is equal to or lower than the threshold Th2, the processing proceeds to step 308 upon determination that the vehicle is driving in fuel saving mode from the viewpoint of shift operation.

In step 306, a predetermined indicator in a meter display unit 19 is turned off (or remains off). This indicator, when on, indicates that the vehicle is driving in fuel saving mode.

In step 308, the predetermined indicator in the meter display unit 19 is turned on (or remains on).

According to the processing shown in FIG. 3, the predetermined indicator is turned on only if it is determined that the vehicle is driving in fuel saving mode both from the viewpoint of accelerator operation and from the viewpoint of shift operation. Therefore, if it is determined that the vehicle is driving in fuel saving mode from the viewpoint of accelerator operation (YES in step 302), but not from the viewpoint of shift operation (NO in step 304), it is comprehensively determined that the vehicle is not driving in fuel saving mode and, in this case, the indicator is turned off.

The fuel saving driving diagnostic result, though output in the example in FIG. 3 as binary information (on/off of the indicator) indicating whether the vehicle is driving in fuel saving mode, may be output in any mode. For example, the fuel saving driving diagnostic result may be output as a ratio such as a fuel saving degree (see FIG. 4).

The processing routine shown in FIG. 3 may be executed repeatedly at predetermined periodic intervals during the travel of a vehicle, but need not while the clutch is disengaged. More specifically, based on the detection result of the clutch sensor 20, the meter ECU 15 determines whether the clutch is disengaged. While the clutch is disengaged, there is no correlation between the engine speed and the vehicle speed. Therefore, when it is determined that the clutch is disengaged, the meter ECU 15 outputs the previously output value as the fuel saving driving diagnostic result. When it is determined that the clutch is disengaged, it is also possible for the meter ECU 15 not to output a diagnostic result. In addition, when it is determined that the clutch has been disengaged continuously for a predetermined time, the meter ECU 15 may stop the output of a diagnostic result. That is, the meter ECU 15 may stop (or temporarily suspend) the processing routine, shown in FIG. 3, upon determination that the driver has intentionally put the gear in neutral.

When applied to an AT vehicle, the processing routine shown in FIG. 3 may be executed only during the manual mode. In this case, a shift position sensor is provided in place of the clutch sensor 20. If the detection result of the shift position sensor indicates that the gear is in neutral, the meter ECU 15 may stop the output of the diagnostic result. That is, the meter ECU 15 may stop the processing routine shown in FIG. 3.

In the example shown in FIG. 3, though the meter ECU 15 compares the current accelerator opening against the threshold Th1 corresponding to the current vehicle speed in step 302, it is also equivalent for the meter ECU 15 to compare the current vehicle speed against the threshold Th1 corresponding to the current accelerator opening. It is also equivalent for the meter ECU 15 to determine to which area (fuel saving driving area or non-fuel-saving driving area) in the map such as the one shown in FIG. 2A the two-dimensional coordinates, determined by the current vehicle speed and the current accelerator opening, belong. Similarly, in the example shown in FIG. 3, though the meter ECU 15 compares the current engine speed against the threshold Th2 corresponding to the current vehicle speed in step 304, it is also equivalent for the meter ECU 15 to compare the current vehicle speed against the threshold Th2 corresponding to the current engine speed. It is also equivalent for the meter ECU 15 to determine to which area (fuel saving driving area or non-fuel-saving driving area) in the map such as the one shown in FIG. 2B the two-dimensional coordinates, determined by the current vehicle speed and the current engine speed, belong.

In the example shown in FIG. 3, though the meter ECU 15 diagnoses fuel saving driving first from the viewpoint of accelerator operation and then from the viewpoint of shift operation, the diagnosis order may be reversed. In the example shown in FIG. 3, if it is determined that the vehicle is not driving in fuel saving mode from the viewpoint of accelerator operation, the meter ECU 15 does not diagnose fuel saving driving from the viewpoint of shift operation. Instead of this, even if it is determined that the vehicle is not driving in fuel saving mode from the viewpoint of accelerator operation, the meter ECU 15 may diagnose fuel saving driving from the viewpoint of shift operation. In this case, whether or not fuel saving driving is diagnosed from the viewpoint of shift operation may be determined appropriately according to the diagnostic result output method that is used. For example, in a configuration in which only the comprehensive diagnostic result of fuel saving driving is output, there is no need to determine whether the vehicle is driving in fuel saving mode from one viewpoint if it is already determined from the other viewpoint that the vehicle is not driving in fuel saving mode. On the other hand, in a configuration in which fuel saving driving diagnostic results are output individually from both viewpoints (see FIG. 4 and FIG. 5 that will be given later), it is possible to diagnose fuel saving driving from both viewpoints regardless of the fuel saving driving diagnostic result from one of the viewpoints.

Figure 4:
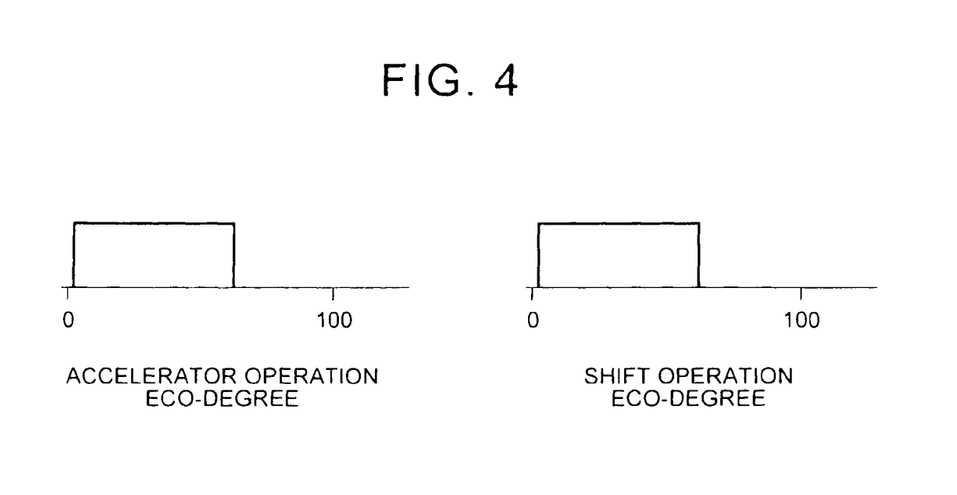
FIG. 4 is a diagram showing an example of the output method of a fuel saving driving diagnostic result.

FIG. 4 is a diagram showing an example of the output method of a fuel saving driving diagnostic result.

In the example shown in FIG. 4, the diagnostic result of fuel saving driving from the viewpoint of accelerator operation is indicated in a ratio (0 to 100%) as the accelerator operation eco-degree. Similarly, the diagnostic result of fuel saving driving from the viewpoint of shift operation is indicated in a ratio (0 to 100%) as the shift operation eco-degree. This display may be output in the meter display unit 19 side by side. The accelerator operation eco-degree and the shift operation eco-degree may be calculated, for example, using the following expressions.

Accelerator operation eco-degree=Current accelerator opening/Threshold $Th1 \times 100(\%)$ Shift operation eco-degree=Current engine speed/Threshold $Th2 \times 100(\%)$ In the above expressions, a parameter (for example, output power), which can be uniquely derived from the accelerator opening, may be used in place of the accelerator opening as described above.

Although the accelerator operation eco-degree and the shift operation eco-degree are indicated each by an area that depends on a ratio in the example shown in FIG. 4, the numeric value indicating the ratio may be displayed with the ratio.

Figure 5:
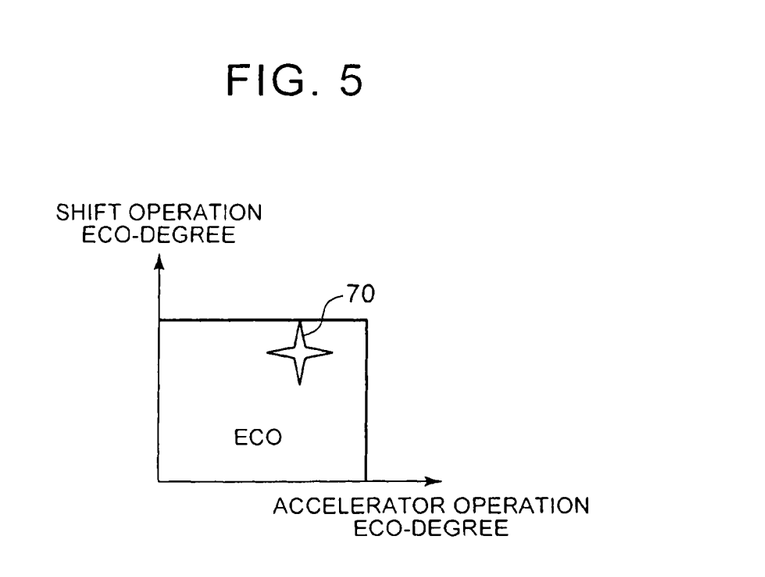
FIG. 5 is a diagram showing another example of the output method of a fuel saving driving diagnostic result.

FIG. 5 is a diagram showing another example of the output method of a fuel saving driving diagnostic result.

In the example shown in FIG. 5, the diagnostic result of fuel saving driving from the viewpoint of accelerator operation and the diagnostic result of fuel saving driving from the viewpoint of shift operation are shown in two-axis representation. This display may be output, for example, in the meter display unit 19. In the example shown in FIG. 5, the two-dimensional position corresponding to the current accelerator operation eco-degree and the current shift operation eco-degree is indicated by the reference numeral 70. The accelerator operation eco-degree and the shift operation eco-degree may be calculated as described above. In the example shown in FIG. 5, the accelerator operation eco-degree and the shift operation eco-degree may be displayed with the numeric values each representing a ratio.

While the embodiments of the present invention have been described above in detail, it is to be understood that the present invention is not limited to the specific embodiments and that various modifications and changes may be made within the scope of claims. It is also possible to combine all or some of the components in the embodiments described above.

For example, though the vehicle speed information is acquired from the vehicle speed sensor 11 in the embodiment described above, other information sources may also be used in place of, or in addition to, the vehicle speed sensor 11. For example, the number of rotations of the output shaft of the transmission or the derivative of the positioning result received from a GPS receiver may be used.

In addition, though the information on the engine speed is acquired based on the signal from the crank position sensor 18 in the embodiment described above, other information sources may also be used in place of, or in addition to, the crank position sensor 18. For example, the number of rotations of the input shaft of the transmission may be used.

In the embodiment described above, the diagnostic result of fuel saving driving from the viewpoint of shift operation may be output with an advisory message about the shift operation. That is, if it is determined that the vehicle is not driving in fuel saving mode from the viewpoint of shift operation, an advisory message indicating the direction in which to shift the gear (for example, change to a higher or lower gear) may be output to allow the driver to drive in fuel saving mode. For example, when the current gear position is the second speed position and the current engine speed is higher than the threshold Th2, an advisory message may be output to change the gear position to the third speed (or fourth speed) position. This advisory message allows the driver to easily understand what shift operation is required in order to drive in fuel saving mode if it is determined that the vehicle is not driving in fuel saving mode from the viewpoint of shift operation.

The fuel saving driving diagnostic result, though output in the meter display unit 19 in the embodiment described above, may be output to other display devices, for example, to a head-up display (HUD) in place of, or in addition to, the meter display unit 19.

Although the meter ECU 15 performs the fuel saving driving diagnostic processing in the above embodiment, any other ECU may perform the fuel saving driving diagnostic processing. In addition, a plurality of ECUs may work together to perform the fuel saving driving diagnostic processing.

What is claimed is:

1. A fuel saving driving diagnostic device comprising: an electronic control unit
    configured to diagnose fuel saving driving from a viewpoint of accelerator operation based on a relation between a parameter related to a vehicle speed and a parameter related to an accelerator operation amount of an accelerator operation, and
    configured to diagnose fuel saving driving from a viewpoint of a shift operation based on a relation between the parameter related to the vehicle speed and a parameter related to engine speed,
the electronic control unit outputting a display showing the diagnostic result of diagnosing fuel saving driving from the viewpoint of the accelerator operation and the diagnostic result of diagnosing fuel saving driving from the viewpoint of the shift operation in a two-axis representation.

2. The fuel saving driving diagnostic device according to claim 1, wherein the fuel saving driving from the viewpoint of the shift operation is diagnosed without considering the accelerator operation amount.

3. The fuel saving driving diagnostic device according to claim 1, wherein the electronic control unit is mounted on a manual transmission vehicle.

4. A fuel saving driving diagnostic system comprising:
a speed sensor that detects a vehicle travel speed;
an opening detection sensor that detects an accelerator pedal opening of an accelerator pedal;
an engine speed sensor that detects engine speed; and
an electronic control unit configured to perform a first diagnosis and a second diagnosis and configured to output a diagnostic result according to a diagnostic result of the first diagnosis and a diagnostic result of the second diagnosis, the first diagnosis being a diagnosis of fuel saving driving based on the travel speed and the accelerator pedal opening from the viewpoint of the operation of the accelerator pedal, the second diagnosis being a diagnosis of fuel saving driving based on the travel speed and the engine speed from the viewpoint of a shift operation,
the electronic control unit outputting a display showing the diagnostic result of diagnosing fuel saving driving from the viewpoint of the accelerator pedal operation and the diagnostic result of diagnosing fuel saving driving from the viewpoint of the shift operation in a two-axis representation.

5. The fuel saving driving diagnostic system according to claim 4, further comprising:
a detection unit that detects a disengagement state of a clutch wherein if it is determined, based on a detection result of the detection unit, that the clutch is disengaged, the electronic control unit outputs the diagnostic result that was output previously.

6. The fuel saving driving diagnostic system according to claim 4, further comprising:
a detection unit that detects a state in which a clutch is disengaged wherein
if it is determined from a detection result of the detection unit that the clutch has been disengaged continuously for a predetermined time, the electronic control unit stops the output of the diagnostic result.

* * * * *